United States Patent [19]

Akiyama

[11] Patent Number: 4,498,158
[45] Date of Patent: Feb. 5, 1985

[54] ADDRESS DATA SEARCHING METHOD FOR DATA RECORDING MEDIUM REPRODUCING DEVICE

[75] Inventor: Tetsuo Akiyama, Saitama, Japan

[73] Assignee: Universal Pioneer Corporation, Tokyo, Japan

[21] Appl. No.: 165,441

[22] Filed: Jul. 2, 1980

[30] Foreign Application Priority Data

Jul. 3, 1979 [JP] Japan .................................. 54-84704

[51] Int. Cl.³ ......................... G11B 7/00; G11B 17/00
[52] U.S. Cl. ....................................... 369/32; 360/78; 365/234; 369/33; 369/41
[58] Field of Search .................................. 369/32-33, 369/41; 365/234; 360/78, 72.2, 74.4; 358/342

[56] References Cited

U.S. PATENT DOCUMENTS

| | | | |
|---|---|---|---|
| 3,562,725 | 10/1968 | Klein et al. | 360/78 |
| 4,106,058 | 8/1978 | Romeas et al. | 360/78 |
| 4,138,663 | 2/1979 | Zehurean et al. | 365/234 |
| 4,138,741 | 2/1979 | Hedlund et al. | 365/234 |
| 4,199,820 | 4/1980 | Ohtake et al. | 369/33 |
| 4,236,232 | 11/1980 | Jansen et al. | 369/33 |
| 4,375,091 | 2/1983 | Dakin et al. | 360/72.2 |

OTHER PUBLICATIONS

Mathieu, A Random Access System Adpted for the Video Disc: Its Impact on Information Retrieval, SMPTE Jour., 2/77, vol. 86, pp. 80-83.
Broadbent, A Review of the MCA Disco Vision System, SMPTE Journal, 7/74, vol. 83, pp. 554-559.

*Primary Examiner*—Raymond F. Cardillo, Jr.
*Attorney, Agent, or Firm*—Sughrue, Mion, Zinn, Macpeak and Seas

[57] ABSTRACT

A method and apparatus for operating a data recording medium reproducing device in which a pick-up device reads address data from a recording medium such as a video disc. The read off data is compared with a supply desired address data to form a signal which represents whether the present position is inside, outside, or coincident with the desired position. A sequence controller operates in response to the output of the comparison to drive coarse and fine adjustment devices which position the pick-up device successively until the desired position or a position within the vicinity of desired position is reached.

9 Claims, 2 Drawing Figures

ADDRESS DATA SEARCHING METHOD FOR DATA RECORDING MEDIUM REPRODUCING DEVICE

BACKGROUND OF THE INVENTION

The present invention relates to an address data searching device for a data recording medium reproducing device.

According to one well known method of recording data on a video disc, recesses called "pits" are formed on the disc forming a coaxial or spiral track with data recorded by varying the lengths and/or spacings of the pits. Address data corresponding to the contents of recorded data is also recorded on the disc so that the contents of a desired record can be reproduced by supplying the appropriate address data. A pick-up device utilizing light is used to read the data of the disc. More specifically, a light beam applied to the disc is modulated by the presence or absence of pits on the disc as the beam passes through or is reflected by the disc with a data signal produced by demodulating the reflected or transmitted light.

In a data recording disc reproducing device for use with such a disc, the relative positions of the disc and the pick-up device must be finely adjusted. To this effect, the reproducing device is provided with a so-called tracking servo device which includes both a fine adjustment device and a coarse adjustment device. The fine adjustment device operates to control the rotation of a light deflecting tracking mirror so that the illuminating light beam correctly follows the data track on the disc at all times. The coarse adjustment device operates to coarsely adjust the relative positions of the disc and the pick-up device in the radial direction of the disc. More specifically, the coarse adjustment device drives, when address data has been supplied, a slider carrying the pick-up device and moves it in the radial direction of the disc so that the pick-up position is positioned on the track specified by the address data.

Heretofore, in such a reproducing device, when a desired address has been specified, the corresponding address on the disc is searched for with a technique in which address data read by the pick-up device is compared with the supplied address data and, according to a difference output between the supplied address and that corresponding to the current position of the pick-up device, the speed by which the slider is moved by the coarse adjustment device is controlled. However, this address data searching technique is disadvantageous in the following points. When drop-out occurs at a track position where the specified address data has been recorded because of damage to or fouling of the track, the control system does not operate satisfactorily as it then falls into a looping mode in which the searching operation around the position of the specified address data continues until the device is manually stopped. When the slider stops, it has a tendency to overshoot or go beyond the desired position due to inertia. Accordingly, in order to position the pick-up device on the track where the specified address data has been recorded, a complex stopping mechanism which provides compensation for overshooting of the slider must be provided for the slider driving section. Furthermore, since the slider moving speed is controlled according to the difference between the address data read by the pick-up device and the specified address data, the construction of a comparison circuit used for comparing the two data is necessarily intricate.

Accordingly, an object of the present invention is to provide an address data searching device in which the pick-up device is accurately positioned on the track where the desired address data has been recorded and, even if drop-out occurs on the track, the pick-up device will nevertheless still be stopped in the vicinity of the desired track.

Thus, a specific desired feature of the invention resides in that even in the case where the specified address data cannot be read because of the occurrence of drop-out, the pick-up device will still be positioned in the vicinity of the track where the specified address data is recorded.

SUMMARY OF THE INVENTION

This, as well as other objects of the invention, are met by a method for operating a data recording medium reproducing device in which an address is read by pick-up means from a data track of a recording medium and compared with a supplied desired address data. An output signal is generated which represents whether the read address data is larger than, smaller than or coincident with the desired address data. It is not necessary to actually compute the difference between the two address data. In response to the output signal generated from the comparison, coarse and fine adjustment means are operated by a sequence controller to position the pick-up in the vicinity of the desired track even if the actual desired address cannot be read from the recording medium because the recording medium has been scratched or fouled.

Further in accordance with this object, the invention can be practiced by a method for operating a data recording medium reproducing device including pick-up means for reading address data from a data track of a recording medium, means for coarsely adjusting the relative positions of the recording medium and the pick-up means, means for finely adjusting the relative positions, address supplying means for specifying desired address data on the recording medium, means for comparing address data read by the pick-up means with the desired address data including the steps of the comparison means providing a first output when the read position of the pick-up means is positioned inside of the recording medium with respect to the position of the desired address data, a second output when the pick-up means is coincident with the position of the desired address data and a third output when the pick-up means is positioned outside of the recording medium with respect to the position of the desired address data. Coarse adjustment means is then driven a predetermined number of times according to an output of the comparison means provided at the start of an address data searching operation until the comparison means provides an output opposite to the output of the comparison means which was present before the coarse adjustment means was driven. The relative position of the pick-up means is then repeatedly moved a predetermined number of tracks with the fine adjustment means to read address data until the comparison means provides an output which is opposite to the output of the comparison means which was present when the driving of the coarse adjustment means was ended. The position of the pick-up is then repeatedly moved by one track with the fine adjustment means to read address data until the comparison means provides the second output

DESCRIPTION OF THE PREFERRED EMBODIMENTS

The invention will be described in detail with reference to the accompanying drawings.

Figure 1:
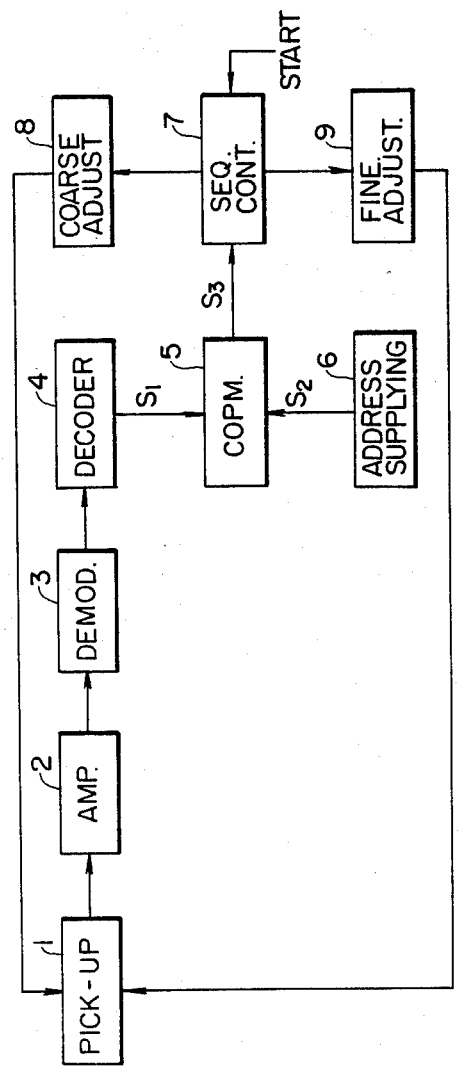
FIG. 1 is a block diagram showing a preferred embodiment of a data recording medium reproducing device.

FIG. 1 in the accompanying drawings is a block diagram showing the circuit arrangement of a preferred embodiment of a data recording medium reproducing device of the invention. In the figure, a pick-up device 1 applies light to a disc (not shown) and receives a detection signal which is generated in response to light reflected by or which has passed through the recording surface which was previously recorded by the presence and absence of pits. The detection signal is applied through an amplifier 2 to a demoulator 3. The detection signal demodulated by the demodulator 3 is applied to a decoder 4 where it is converted into an analog or digital signal which is applied to one input of a comparator circuit 5. An address supplying circuit 6 provides the address data to be searched for on the disc. An output signal corresponding to the specified address data of the address supplying circuit 6 is applied to the other input of the comparator circuit 5.

The comparator circuit 5 compares the detection signal S1 corresponding to the address data read out by the pick-up device 1 with the reference signal S2 corresponding to the specified address data. In response to the comparison operation an output signal S3 is generated which is coupled to a sequence control circuit 7. When the detection signal S1 is smaller than the reference signal S2 corresponding to the case when the read position of the pick-up device is further inside of the disc than the position specified by the supplied address data, the output signal S3 is at a negative level, for example. When the two signals S1 and S2 coincide with one another, the output signal S3 is at a zero level. When the signal S1 is larger than the signal S2, that is when the read position of the pick-up device is further outside than the position specified by the supplied address data, the output signal S3 is at a positive level. Since the comparator circuit 5 need only determine whether the detection signal S1 is greater than, smaller than or coincident with the reference signal S1 and need not calculate the difference between the two signals S1 and S2, the circuitry of the comparator circuit 5 is simple. According to the output signal of the comparator circuit 5, the sequence control circuit 7 controls a coarse adjustment device 8 and a fine adjustment device 9 which together form the tracking servo device.

The coarse adjustment device 8 operates to drive radially along the disc, for instance, a slider (not shown) carrying the pick-up device 1 to position the pick-up device 1 on the track specified by the address data. The fine adjustment device 9 controls the rotation of a tracking mirror (not shown) so that the illuminating light beam follows the track of the disc.

Next, an address data searching technique according to the invention utilized with a data recording medium reproducing device constructed as described above will be described.

After desired address data has been supplied by the address supplying circuit 6, a control start signal is applied to the sequence control circuit 7. The sequence control circuit 7 operates to control the following operations in response to the output signal S3 from the comparator circuit 5. In the case where at the start of the control operation of the control circuit 7, the pick-up device 1 is so positioned that the address read by the pick-up device 1 is equal to or greater than that supplied and accordingly the output signal S3 from the comparator circuit 5 is at the zero or positive level and the coarse adjustment device 8 drives the slider in a first direction until the output S3 is set to the negative level. Driving of the slider is suspended when the output S3 reaches the negative level. When the comparison output S3 is at the negative level, the slider is driven in a second direction until the output S3 is set to the positive level. In this case, the driving of the slider is suspended when the comparison output S3 is set to the positive level.

If the comparison output S3 is at the positive level, the rotation of the tracking mirror by the fine adjustment means 9 is controlled so that the illuminating light beam is moved over a predetermined number of tracks in the first direction within one revolution of the disc after which the address data from the track is read. This operation is repeatedly carried out until the comparison output S3 is set to the negative level. When the comparison output S3 has been set to the negative level, the rotation of the tracking mirror is so controlled that the illuminating light beam is moved by one track in the second direction and the next following address data is read. The above-described tracking mirror movement and address data reading operations are repeatedly carried out until the comparison output S3 is set to the zero or positive level after which the address data searching operation is halted when the comparison output S3 is set to the zero or positive level.

As is apparent from the above description, according to the invention, even if drop-out occurs because of damage to the track or dust stuck on the track, the control system still will operate accurately so that the pick-up device is still positioned in the vicinity of the track on which specified address data has been recorded. Since the address data searching operation is accomplished by fine adjustment in a single-track movement mode, the pick-up device is accurately and positively positioned on the track specified by the address data. Furthermore, the comparator circuit is so designed as to merely compare the two signals but it need not be designed to calculate the difference between the two signals as was required in prior art arrangements. Therefore, the comparator circuit has a simple construction.

The coarse adjustment device 8 and the fine adjustment device 9 are not limited to the above-described embodiments. That is, any structures may be employed for the adjustment devices 8 and 9 if they can finely and coarsely adjust the relative positions of the disc and the pick-up device 1.

Figure 2:
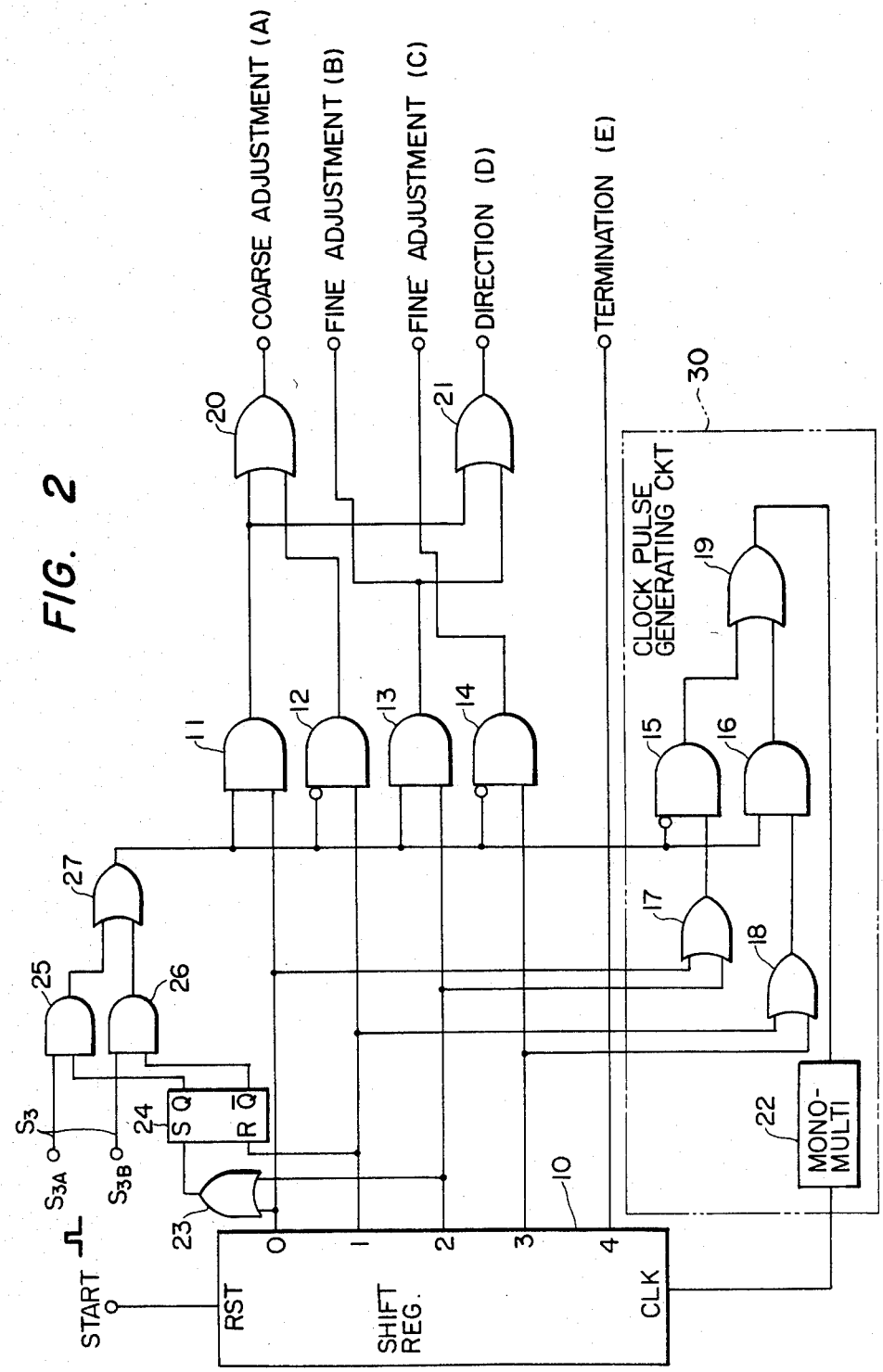
FIG. 2 is a schematic diagram of a sequence control circuit used in the device of FIG. 1.

Details of the sequence control circuit 7 will be described with reference to FIG. 2. The signal $S_3$, composed of two binary signals, is indicative of a positive level, zero level or negative level depending upon where the pick-up device is positioned with respect to a specified address on the record disc. Specifically, when "high" level signals are applied to both terminals "$S_{3A}$" and "$S_{3B}$", the signal $S_3$ is indicative of the positive level. When a "high" level and a "low" level signal are applied to the terminals "$S_{3A}$" and "$S_{3B}$", respectively, then the signal $S_3$ is indicative of the zero level. When "low" level signals are applied to both the terminals "$S_{3A}$" and "$S_{3B}$", the signal $S_3$ is indicative of the negative level. The state of the signals at the terminals "$S_{3A}$" and "$S_{3B}$" is determined by comparison of the signals $S_1$ and $S_2$.

When a start signal STRT is applied to a reset terminal RST of a shift register 10, a "high" level signal appears on an output line "0" of the shift register 10. In response to the start signal and the state of the signals at the terminals "$S_{3A}$" and "$S_{3B}$", outputs are produced at terminals A, B, C, D and E corresponding respectively to coarse adjustment, first fine adjustment, second fine adjustment, direction and termination through and AND/OR gate structure. Output signals produced at the coarse adjustment terminal A and the direction terminal D are coupled to the coarse adjustment device 8 to thereby actuate it. Output signals produced at the fine adjustment terminals B and C as well the signal at the terminal D are coupled to the fine adjustment device 9 to thereby actuate it.

Upon application of the start signal to the reset terminal RST of the shift register 10, a "high" level signal appears on the output line "0" of the shift register. This high level signal is passed through the OR gate 23 to the set terminal S of flip-flop 24, thereby raising the Q output of the RS flip-flop 24 and providing a high level input to the lower input terminal of the AND gate 25. At this time, if a signal $S_3$ indicative of the positive level (or the zero level) is present corresponding to "high" level signals being applied to the terminals "$S_{3A}$" and "$S_{3B}$" (or "high" and "low" level signals being applied to the terminals "$S_{3A}$" and "$S_{3B}$", respectively), AND gate 25 and OR gate 27 are enabled so that high level outputs are produced at the output terminals A and D through AND gate 11 and OR gates 20 and 21. When the signal $S_3$ changes to indicate the negative level during which time "low" signals are applied to the terminals "$S_{3A}$" and "$S_{3B}$", the first step of "coarse" adjustment in the first direction is finished and subsequently the second step of "coarse" adjustment starts in the second direction. Since AND gates 25 and 26 and OR gate 27 are disabled, a clock pulse generating circuit 30 is actuated. The clock pulse generating circuit includes AND gates 15 and 16, OR gates 17, 18 and 19 and a monostable multivibrator 22. Specifically, OR gate 17, AND gate 15 and OR gate 19 are enabled to thereby actuate the monostable multivibrator 22. A pulse is generated from the monostable multivibrator 22 which is applied to the clock signal input terminal CLK of the shift register 10. In response to the clock pulse, a high level output appears on the output line "1" of the shift register 10 while the ouput line "0" becomes a low level. When the output line "1" of the shift register 10 rises to a high level, and with a low output being provided from the OR gate 27, the AND gate 12 is enabled and a high level output is produced at the terminal A. It is to be noted that the circle at the input of AND gate 12 signifies an inverting input, as do the circles at the inputs of AND gate 14 and AND gate 15. In this situation, the high level output at terminal A and the low level output at terminal D are applied to the coarse adjustment device 8. It should be noted that the "high" level output at terminal D is indicative of the first direction of movement of the pick-up device 1 whereas the "low" level output is indicative of the second direction opposite to the first direction.

The high level output from the "1" terminal of the shift register 10 used to enable the AND gate 12 is also provided to the reset terminal R of the flip-flop 24, thereby resetting the flip-flop 24. As a result, the Q output of the flip-flop 24 will fall to a low level to disable the AND gate 25, while the $\overline{Q}$ output of the flip-flop 24 will provide a high level input to the AND gate 26.

When the signal $S_3$ again rises to a state indicating the positive level, the second step of coarse adjustment is finished and subsequently the third step of fine adjustment starts. More particularly, when the signal $S_{3B}$ rises to a high level to indicate the positive level, and with the AND gate 26 now receiving a high level output from the $\overline{Q}$ output terminal of the flip-flop 24, the output of OR gate 27 rises to a high level to disable the AND gate 12. Since the OR gate 27 provides one high level input to the gate 16, and since the OR gate 18 will provide a second high level input to the gate 16 from the "1" terminal of the shift register 10, the OR gate 19 will enable the multivibrator 22 to provide a further clock pulse to the shift register 10, whereby the high level output will be shifted from the "1" terminal to the "2" terminal of the shift register. The high level output now at the "2" terminal of the shift register 10 will be provided to the AND gate 13 which is already receiving a high level output from the OR gate 27. At this time, an AND gate 13 is enabled, "high" level outputs are produced at the terminals B and D thereby causing fine adjustment in the first be direction to be carried out. The high level output from the "2" terminal of the shift register 10 which is used to enable the AND gate 13 will also be provided through the OR gate 23 to the set input terminal S of the flip-flop 24, thereby providing a high level Q output to the AND gate 25 and a low level $\overline{Q}$ output to the AND gate 26. Thereafter when the signal $S_3$ changes to a state indicating the negative level, the third step of fine adjustment is finished and the fourth step of fine adjustment starts.

More particularly, when the signal $S_{3A}$ falls to a low level, the AND gate 25 is disabled and the output of OR gate 27 falls to a low level, thereby disabling the AND gate 13 and providing a high level input to the AND gate 15. Since the other input to the AND gate 15 is already at a high level due to the high level output of the "2" output terminal of the shift register 10 being provided through the OR gate 17, the output of AND gate 15 will be at a high level and will result in a high level output being provided from the OR gate 19. The clock pulse generating circuit 30 is again actuated and a clock pulse is applied to the clock signal input terminal CLK of the shift register 10. In response to the clock pulse, a high level output appears at the output line "3" of the shift register at which time an AND gate 14 is enabled and a high level output is present at the terminal C. In this situation, fine adjustment in the second direction is carried out by the fine adjustment device 9.

When the signal $S_3$ again is in a state indicating the positive (or zero) level, a clock pulse is generated by the clock pulse generating circuit 30 and is applied to the shift register. More particularly, when the signal $S_{3A}$ rises to a high level, and with the AND gate 25 already receiving a high level output from the Q terminal of the flip-flop 24, a high level output will be provided from the AND gate 25 through the OR gate 27 to disable the AND gate 14 and to provide a high level input to the AND gate 16. The other input to the AND gate 16 will already be at a high level due to the provision of the high level output from the "3" terminal of the shift register 10 through the OR gate 18, and the clock pulse generating circuitry will therefore be enabled to generate a further clock pulse to the shift register 10 to shift the high level output from the "3" terminal to the "4" terminal. Then, the "high" level output appears on an output line "4" to which a termination terminal E is directly connected. When a high level is present on the terminal E, the pick-up device 1 is halted and is then positioned in the vicinity of the track in which specified address data has been recorded.

Coarse and fine adjustment devices 8 and 9 are well known in the art and hence a detailed discussion of the structure is unnecessary and will be omitted.

What is claimed is:

1. A method for operating a recording medium reproducing device comprising the steps of: reading address data from a data track of a recording medium; comparing said address data read from said recording track of said recording medium with supplied address data representing a desired address upon said recording medium in a comparison means to produce an output signal representing whether said read address data is larger than, coincident with, or is smaller than said supplied address data; operating fine and coarse adjustment means to adjust the position of pick-up means relative to said data track in accordance with said output signals from said comparison means such that the direction of position adjustment of said pick-up means is reversed upon the variation of said output signals of said comparison means, said adjustment operation being switched from said coarse adjustment means to said fine adjustment means as a function of an output signal of said comparison means provided at the start of said adjustment operation and in accordance with the number of transitions in said comparison means output signal which have occurred since said start of said adjustment operation, said adjustment operation being switched from said coarse adjustment means to said fine adjustment means independently of the magnitude of the difference between said desired address and said address data read from said recording track.

2. A method for operating a data recording medium as recited in claim 1, wherein said step of operating said fine and coarse adjustment means comprises operating said coarse adjustment means for adjusting the position of said pick-up means in at least a first direction followed by operating said fine adjustment means for finely adjusting the position of said pick-up means in a second direction opposite said first direction, and then operating said fine adjustment means for finely adjusting the position of said pick-up means in said first direction.

3. A method for operating a data recording medium as recited in claim 1, wherein said coarse adjustment means, when driven, adjusts the position of said pick-up means by a first amount relative to said recording medium, and wherein said fine adjustment means, when driven, adjusts the position of said pick-up means by a second amount relative to said recording medium, said second amount being less than said first amount, and wherein said step of operating said fine and coarse adjustment means comprises driving one of said fine and coarse adjustment means a plurality of times in succession until a transition occurs in said output signal from said comparison means.

4. A method for operating a data recording medium reproducing device including pick-up means for reading address data from a data track of a recording medium; means for coarsely adjusting the relative positions of said recording medium and said pick-up means for finely adjusting said relative positions; address supplying means for specifying desired address data on said recording medium; and means for comparing address data read by said pick-up means with said desired address data; comprising the steps of: said comparison means having, when the read position of said pick-up means is inside of said recording medium with respect to the position of said desired address data on said recording medium, coincident with the position of said desired address data, and is positioned outside of said recording medium with respect to the position of said desired address data on said recording medium, a first output state, a second output state, and a third output state, respectively, said third output state representing a positional relationship relatively opposite to a positional relation represented by said first output state; deflecting said coarse adjustment means in a first direction until said output of said comparison means changes state and in a second direction opposite to said first direction until said output of said comparison means again changes state, the state of said output at the end of said deflection in said second direction being the same as the state of said output at the start of said deflection in said first direction; repeatedly moving said relative position a predetermined number of tracks with said fine adjustment means to read address data out until said output of said comparison means changes state to a state which is different from said state of said output of said comparison means which was provided at the end of said deflection of said coarse adjustment means in said second direction; and repeatedly moving said relative position by one track with said fine adjustment means to read address data thereat until said output of said comparison means changes state to a state which is different from a state of said output of said comparison means which was provided at the end of said movement of said relative position by said predetermined number of tracks by said fine adjustment means.

5. The method for operating a data recording medium as recited in claim 4, wherein said comparison means produces output signals of said first or second states at the start of said deflection of said coarse adjustment means, said output switching to said third state to end said deflection of said coarse adjustment means in said first direction, and said output switching to said first or second states to end said deflection of said coarse adjustment means in said second direction.

6. A device for positioning pick-up means for reading data from a data track of a recording medium, comprising: pick-up means for reading address data from a data track of said recording medium, means for assembling a signal picked up by said pick-up means into address data; means for supplying address data representing a desired address upon said recording medium; means for comparing the assembled address data with said supplied address data to produce an output signal representing whether said assembled address data represents a position upon said recording medium inside of the recording medium with respect to the position of said desired address data, a position outside of said recording medium with respect to the position of said desired address data, or coincident with the position of said desired address data; fine and coarse adjustment means for positioning said pick-up means in response to said output signal from said comparing means such that the direction of position adjustment of said pick-up means is reversed upon the variation of said output signal of said comparing means, and a sequence controller comprising a shift register for operating said fine and coarse adjustment means in response to said output signal from said comparing means, said sequence controller including said shift register selecting either said fine adjustment means or said coarse adjustment means for operation, said selection being made independently of the magnitude of the difference between said assembled address and said supplied address.

7. A device as claimed in claim 6, wherein said sequence controller operates said coarse adjustment means for moving said pick-up means in a first direction, then operates said fine adjustment means for moving said pick-up means in a second direction opposite said first direction, and finally operates said fine adjustment means for moving said pick-up means in said first direction.

8. A device for positioning pick-up means for reading data from a data track of a recording medium, comprising: pick-up means for reading address data from a data track of said recording medium; means for assembling a signal picked up by said pick-up means into address data; means for supplying address data representing a desired address upon said recording medium; means for comparing the assembled address data with said supplied address data to produce an output signal representing whether said assembled address data represents a position upon said recording medium inside of the recording medium with respect to the position of said desired address data, a position outside of said recording medium with respect to the position of said desired address data, or coincident with the position of said desired address data; fine and coarse adjustment means for positioning said pick-up means in response to said output signal from said comparing means such that the direction of position adjustment of said pick-up means is reversed upon the variation of said output signal of said comparing means, and a sequence controller comprising a shift register for operating said fine and coarse adjustment means in response to said output signal from said comparing means, wherein said shift register of said sequence controller includes first through fifth output lines and a reset terminal, said shift register activating said first output line in response to a signal applied to said reset terminal, said sequence controller further comprising:

first and second AND gate, first and second lines carrying the output signal from said comparing means being coupled to first and second inputs, respectively, of said first and second AND gates, a first OR gate having inputs coupled to outputs of said first and second AND gates;

third through sixth AND gates each having an input coupled, respectively, to said first through fourth output lines of said shift register, said third and fifth AND gates having second inputs coupled to an output of said first OR gate, and said fourth and sixth AND gates having inputs coupled to receive said output of said first OR gate inverted;

second and third OR gates, said second OR gate having a first input coupled to an output of said third AND gate and a second input coupled to an output of said fourth AND gate and said third OR gate having a first input coupled to said output of said third AND gate and a second input coupled to an output of said fifth AND gate, a coarse adjustment activating signal being formed on an output of said second OR gate, a first fine adjustment activating signal being formed on said output of said fifth AND gate, a second fine adjustment activating signal being formed on an output of said sixth AND gate and a direction indicating signal being formed on an output of said third OR gate;

a fourth OR gate having a first input coupled to said first output line of said shift register and a second input coupled to said third input line of said shift register;

a set-reset flip-flop having a set input coupled to an output of said fourth OR gate and a reset input coupled to said second output line of said shift register, a first output of said set-reset flip-flop being coupled to a second input of said first AND gate and a second output of said flip-flop being coupled to a second input of said second AND gate; and clock pulse generating means operating in response to the state of said first through fourth output lines of said shift register and to said output of said first OR gate to produce clock pulses for operating said shift register.

9. The device of claim 8 wherein said clock pulse generating means comprises a fifth OR gate having a first input coupled to said first output line of said shift register and a second input coupled to said third output line of said shift register; a sixth OR gate having a first input coupled to said second output line of said shift register and a second input coupled to said third output line of said shift register; a seventh AND gate having a first input coupled to an output of said fifth OR gate and a second input coupled to receive said output of said first OR gate inverted; an eighth AND gate having a first input coupled to said output of said first OR gate and a second input coupled to an output of said sixth OR gate; a seventh OR gate having a first input coupled to an output of said seventh AND gate and a second input coupled to an output of said eighth AND gate; and a monostable multivibrator having a trigger input coupled to an output of said seventh OR gate and having an output coupled to a clock input of said shift register.

* * * * *